(No Model.)
W. G. ABEL.
BALL AND EXPANSION PIPE CONNECTION.
No. 290,196. Patented Dec. 18, 1883.
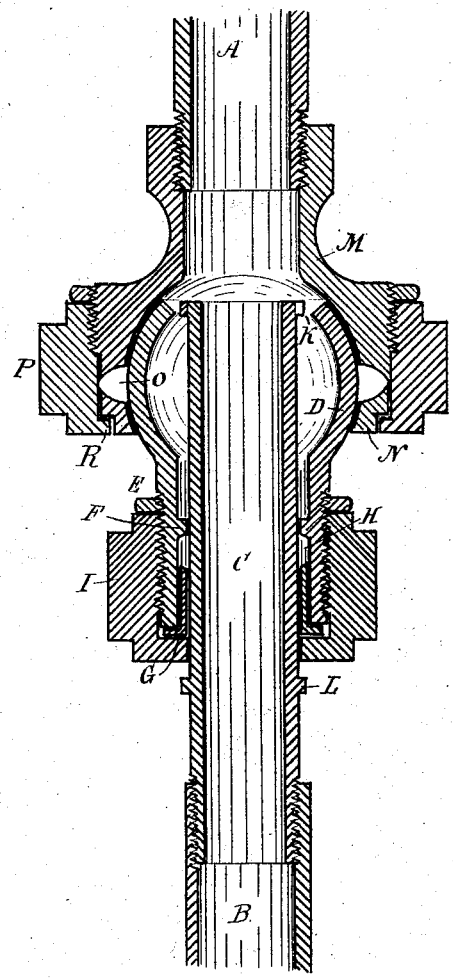

United States Patent Office.

WILLIAM G. ABEL, OF TITUSVILLE, PENNSYLVANIA, ASSIGNOR OF ONE-HALF TO JAMES R. BARBER, OF SAME PLACE.

BALL AND EXPANSION PIPE CONNECTION.

SPECIFICATION forming part of Letters Patent No. 290,196, dated December 18, 1883.

Application filed May 4, 1883. (No model.)

*To all whom it may concern:*

Be it known that I, WILLIAM G. ABEL, a citizen of the United States, residing at Titusville, in the county of Crawford and State of Pennsylvania, have invented a new and Improved Ball and Expansion Pipe Connection, of which the following is a specification.

My invention relates, more particularly, to that class of joints or pipe-connections—as in connecting steam, air, or water pipes between two railroad-cars—where the two pipes to be connected are constantly changing their relative positions, both laterally and longitudinally, my object being to construct a cheap, durable, simple, and compact joint. This I accomplish by the mechanism illustrated in the accompanying drawing, representing a longitudinal section of my invention.

A and B are the two pipes the ends of which it is desired to connect in the manner mentioned.

C is a sliding or expansion tube attached to the pipe B.

D is a segment of a spherical shell, having the hollow neck E, the inside of which is of a greater diameter than the outside of the expansion-tube C. The shell D is open at the opposite side from the neck E, of an equal or somewhat greater diameter than the diameter of the neck E.

F is an internal collar inside the neck E, attached to the neck, and made to fit closely around the expansion-tube C.

G is a packing-gland fitting loosely around the expansion-tube C, and very nearly filling the cylindrical space between the exterior of the expansion-tube C and the interior of the neck E, leaving a space, H, between the end of the gland G and the collar E, for packing the joint around the tube C.

I is a stuffing-nut, engaging with an exterior thread on the neck E, and acting on the gland G, for compressing the packing in the space H.

K is a collar on the extreme end of the expansion-tube C, which, as the tube is drawn out, engages with the collar F, and prevents the tube from being entirely drawn from the neck E. The collar K is not screwed onto the tube C but is held in place by a small lip on the end of the tube sufficient to resist any ordinary pressure; but when any extraordinary strain is brought upon the joint, as in the breaking of the connection between two railroad-cars, the collar K is drawn from the tube and the tube withdrawn entirely from the neck E. This is done to prevent any fracture in such an event to any other portion of the joint.

L is a collar secured around the tube C, which engages with the stuffing-nut I, and prevents the tube from sliding into the neck and joint farther than may be desired.

To the pipe A, I attach the bushing M, the inner part of which, beyond the end of the pipe A, is made spherically concave, of a diameter equal to that at the outer surface of the spherical shell D, and extending so as to inclose the shell D nearly to the central point of the sphere, or nearly opposite the center of the sphere, of which D is a portion of the shell. Beyond the central point of the sphere I place the packing ring or gland, N, the inner surface of which is also made to fit the outer surface of the shell D. The bushing M and gland N are so fitted that when drawn together so far as allowed by the shell D there is left between them the space O, which is to be filled with hemp or any other kind of elastic packing.

P is a stuffing-nut engaging with a thread on the outer surface of the bushing M, and having a collar, R, engaging with a recess in the gland-ring N, for the purpose of holding the gland-ring in place and drawing it up, compressing the packing in the space O.

The operation of the joint is simple and obvious. The shell D, connected to the pipe B in the manner described, forming the ball; and the bushing M, gland-ring N, and stuffing-nut P, attached to the pipe A, forming the socket, allows a free swing of one pipe upon the other in any direction of nearly or quite one-sixth of a circle without disengaging any portion of the shell D from the incasing-bushing M or offering any obstruction to the flow of fluid through the joint from the pipe B to the pipe A, or vice versa, the packing in the space O preventing any escape of fluid around the shell D. The expansion-tube C, sliding inside the neck E, as described, allows of a longitudinal expansion or contraction at the same time.

By connecting two joints constructed in the manner described, and with a joint of pipe of greater or less length, as may be desired, between them, any motion, as the rocking of one railroad-car upon another, can be successfully overcome.

I claim as my invention—

1. In a ball and expansion pipe connection, the combination, with the bushing having its interior concaved, the gland-ring, and the stuffing-ring which secures them together, the said bushing and ring having a packing-space between them, of the spherical shell having an exteriorly-screw-threaded neck provided with an inner collar, the gland-ring fitting therein, the stuffing-nut screwed thereon, and the expansion-tube fitting within said shell and neck, and provided with external collars, whereby it is prevented from being drawn out under ordinary pressure, substantially as described.

2. The combination, in a ball and expansion pipe connection, of the spherical shell having an exteriorly-screw-threaded neck provided with an inner collar, the gland-ring fitting therein, and the stuffing-nut secured thereon, of the expansion-tube provided with exterior collars, the one within and the other without the shell, substantially as described.

WILLIAM G. ABEL.

Witnesses:
A. B. HOWLAND,
H. S. BATES.